United States Patent Office 2,848,304
Patented Aug. 19, 1958

2,848,304
PROCESS FOR PRODUCING DICOBALT OCTACARBONYL

Toichi Yoshida, Kamakura-shi, Kanagawa-ken, Ryoji Iwanaga, Magome-cho, Ota-ku, Tokyo, and Hisao Mori, Setagaya-ku, Tokyo, Japan, assignors to Ajinomoto Co., Inc., Tokyo, Japan, a corporation of Japan No Drawing. Application April 4, 1956
Serial No. 575,923

Claims priority, application Japan April 22, 1955

2 Claims. (Cl. 23—203)

This invention relates to the preparation of highly active dicobalt octacarbonyl catalyst to be used in the transformation of olefinic compounds to oxygenated compounds by hydroformylation.

In accordance with the invention, there is provided a process comprising adding a dehydrating agent and a material selected from the group consisting of pyridine, lutidine and picoline to a cobalt material selected from the group comprising oxides of cobalt, salts of cobalt and metallic cobalt, and reacting carbon monoxide and hydrogen with the said mixture under pressure (50–1000 kg./cm.$^2$) at 100–200° C. to form dicobalt octacarbonyl.

An object of this invention is to provide a method for preparing active dicobalt octacarboxyl catalyst from metallic cobalt or cobalt compounds and pyridine bases.

Several methods are known for preparing dicobalt octacarbonyl by reacting cobaltous compounds suspended in inert solvents with carbon monoxide and hydrogen under appropriate pressure and a temperature of above 150° C., wherein a slight quantity of dicobalt octacarbonyl is used as a reaction initiator (U. S. Pat. 2,477,553, 1949). According to our observations, however, the speed of this reaction is not sufficiently high, especially at lower temperatures, for a synthesis, for example, of pure β-formylpropionate with good yields.

We have found that if a slight quantity of pyridine or its homologues such as lutidine or picoline are added in an inert solvent, the reaction is markedly accelerated at a temperature of about 110° C. If desired, a solid dehydrating agent selected from the group consisting of diatomaceous earth, silicagel, activated charcoal and kaolin may be used with pyridine bases. With the addition of the dehydrating agent, cobalt oxide could be converted more rapidly to dicobalt octacarbonyl with a high yield over 90% in theory. Moreover, resulting dicobalt octacarbonyl solutions containing pyridine bases are found to be more effective as an active catalyst for the hydroformylation reaction of acrylic esters than cobaltcarbonyl catalysts prepared by known methods.

When dehydrating agents are not used, the conversion of cobalt oxide to dicobalt octacarbonyl does not exceed 60% (theoretical). We observed that the particles of cobalt oxide were impregnated with water resulting from oxygen of the oxide and hydrogen, and deposited as an agglomeration at the bottom of the solution and, hence, the contact of reacting gases with the cobalt oxide was disturbed, with the result of substantially ending the reaction. Accordingly, we consider that diatomaceous earth or silicagel is not a simple dispersing agent but it acts as dehydrating agent at the same time.

This invention is illustrated further by the following examples.

EXAMPLE 1

A mixture containing 200 ml. of benzene, 5 millimoles of dicobalt octacarbonyl as an initiator, and 16.6 grams (about 200 mM.) of finely divided cobaltic oxides was placed in a stainless steel shaker tube, having a 600 ml. capacity, and water gas ($CO:H_2 = 1:1$) was introduced at room temperature until the pressure gauge indicated 200 kg./cm.$^2$, and then the tube was heated at a temperature of 110° C. which was maintained constant as far as possible during the operation. Then shaking was started and continued until the pressure drop became substantially imperceptible. After, the shaker was cooled with tap water, the resulting brownish product was discharged from the shaker and filtered. A portion of this product was analysed according to the method of Wender (Analy. Chem., 24 (1952), 174) and was shown to be dicobalt octacarbonyl. The residue was dried and weighed.

If 1 to 6 mM. pyridine or lutidine or picoline is added to 200 ml. benzene, the reaction is accelerated about 5 to 10 times as seen in Table 1.

Table 1

| Added pyridine base, mM. | Temp., ° C. | Time required for pressure drop to 55 Kg./cm.$^2$, min. | Dicobalt octacarbonyl yield percent of theoretical |
|---|---|---|---|
| 0 | 110 | 62 | 64.2 |
| Pyridine 1 | 110 | 14 | 64.0 |
| Pyridine 2 | 110 | 11 | 65.8 |
| Pyridine 6 | 110 | 6 | 62.8 |
| Lutidine 2 | 110 | 12 | 64.8 |

EXAMPLE 2

A mixture containing 200 ml. of benzene, 5 millimoles of dicobalt octacarbonyl as an initiator, and 16.6 grams (about 200 mM.) of finely divided cobaltic oxide, and 2 mM. pyridine, and 5 grams of a suitable dehydrating agent such as dried diatomaceous earth was placed in a shaker, and then water gas ($CO:H_2 = 1:1$) was introduced at room temperature until the pressure gauge indicated 200 kg./cm.$^2$, and the mass was agitated at a temperature of 110° C., for 25 to 35 minutes. The resulting product was treated similarly to Example 1, and the product was proven to be dicobalt octacarbonyl by analysis. The conversion was almost complete and the yield of this substance was markedly increased as seen in Table 2.

Table 2

| 5 grams of dehydrating agent | Temp. ° C. | Reaction time, min. | Dicobalt octacarbonyl yield % theoretical |
|---|---|---|---|
| Diatomaceous earth | 110 | 32 | 91 |
| Silicagel | 110 | 30 | 82 |
| Activated charcoal | 110 | 25 | 77 |
| Kaolin | 110 | 35 | 76 |

EXAMPLE 3

The dicobalt octacarbonyl containing pyridine prepared according to the present invention is used with much advantage for hydroformylation of crylates as shown in Table 3. It will be seen in Table 3 that the hydroformylation reaction can be completed with much less quantity of dicobalt octacarbonyl in a much shorter time when dicobalt octacarbonyl containing pyridine is used compared with cases where dicobalt octacarbonyl not containing pyridine is used. β-Formylpropionate can be increased, and at the same time we can economize the quantity of expensive cobalt carbonyl catalyst required, Table 3

| dicobalt octacarbonyl, mM. | Temp., °C. | Pyridine, mM. | reaction time, min. | yield of β-formyl-propionate percent theoretical |
|---|---|---|---|---|
| 4.60 | 120 | 0 | 10 | 89.7 |
| 2.30 | 120 | 0 | 28 | 88.4 |
| 1.15 | 120 | 0 | 70 | 88.9 |
| 1.15 | 120 | 2.3 | 27 | 85.9 |
| 1.15 | 120 | 4.6 | 22 | 85.0 |
| 1.15 | 120 | 6.9 | 26 | 85.7 |

Note: The hydroformylation reaction is carried out by using 43 g. of methyl acrylate (92.8% purity, 465 mM.) in 150 ml. of benzene which contains the above described catalyst.

What is claimed is:

1. In a process for producing dicobalt octacarbonyl by reacting cobalt substance in inert solvent with carbon monoxide and hydrogen under pressure and heating, a process for producing dicobalt octacarbonyl comprising performing the reaction in the presence of a pyridine base selected from the group consisting of pyridine, lutidine, and picoline at temperature of about from 100° C. to about 200° C. under pressure from 50 kg./cm.$^2$ to 1000 kg./cm.$^2$.

2. A process for producing dicobalt octacarbonyl according to claim 1, wherein a solid dehydrating agent selected from the group consisting of diatomaceous earth, silica-gel, activated charcoal and kaolin is employed with the pyridine base.

References Cited in the file of this patent

UNITED STATES PATENTS

| 2,437,600 | Gresham et al. | Mar. 9, 1948 |
| 2,477,553 | McKeever | July 26, 1949 |
| 2,549,454 | Gresham et al. | Apr. 17, 1951 |
| 2,748,167 | Hagemeyer et al. | May 29, 1956 |

FOREIGN PATENTS

| 504,454 | Canada | July 20, 1954 |

OTHER REFERENCES

Mellor: "Treatise on Inorganic and Theoretical Chemistry" (1924), vol. 5, page 957.